Aug. 11, 1970     R. CARVELL, JR     3,523,905
METHOD OF PREPARING PHOSPHORS AND COLOR
DISPLAY SYSTEMS CONTAINING SAME
Filed Dec. 14, 1967     2 Sheets-Sheet 1
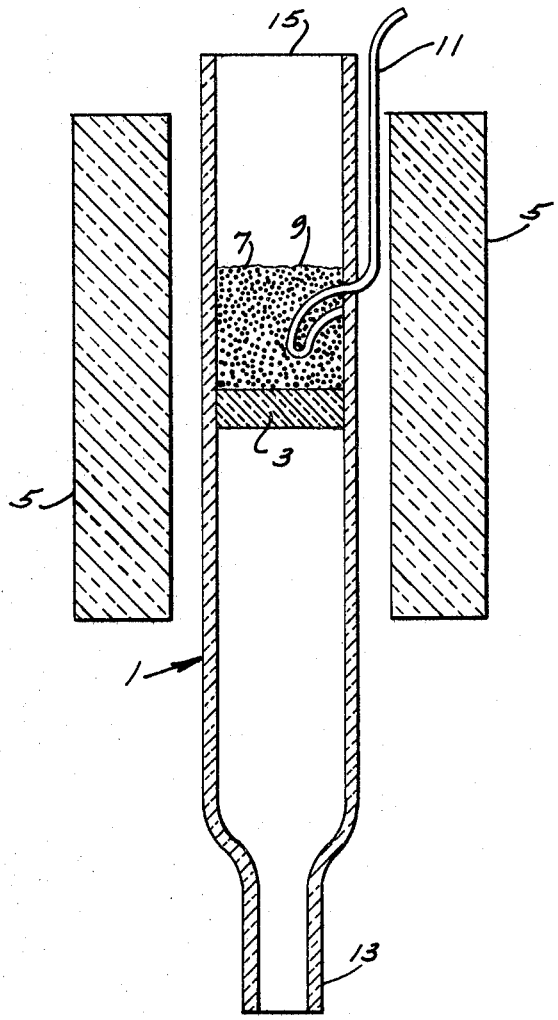
FIG. 1
FIG. 2
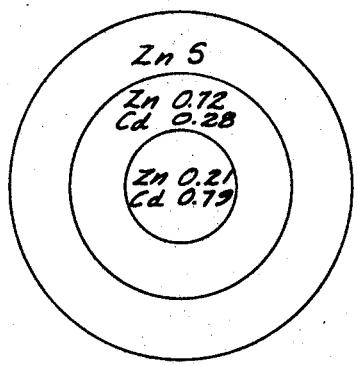
FIG. 3
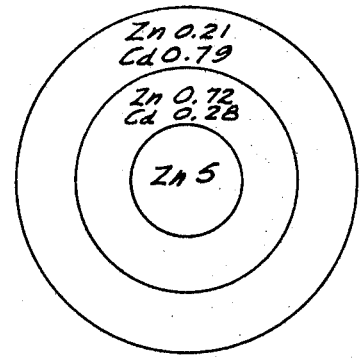

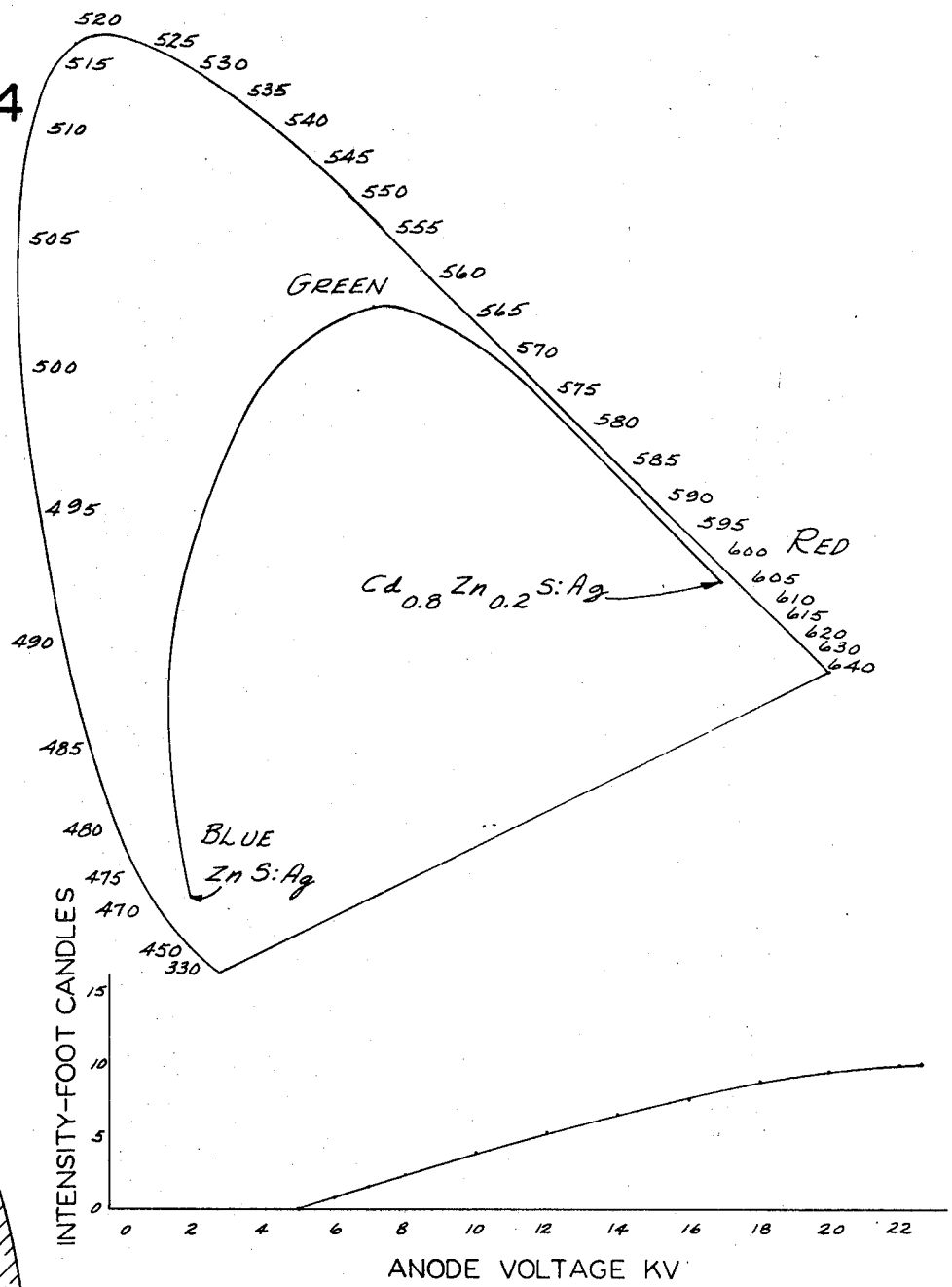
FIG. 4
FIG. 5
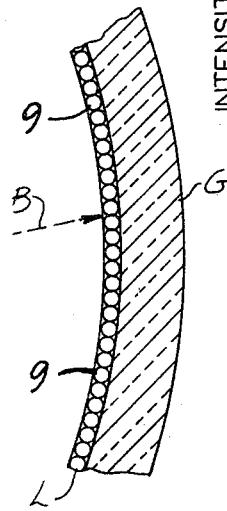
FIG. 6

United States Patent Office 3,523,905
Patented Aug. 11, 1970

3,523,905
METHOD OF PREPARING PHOSPHORS AND COLOR DISPLAY SYSTEMS CONTAINING SAME
Robert Carvell, Jr., Dallas, Tex., assignor to Texas Instruments Incorporated, Dallas, Tex., a corporation of Delaware
Filed Dec. 14, 1967, Ser. No. 690,569
Int. Cl. C09k *1/12;* H01j *1/63, 29/20*
U.S. Cl. 252—301.6     9 Claims

ABSTRACT OF THE DISCLOSURE

Zinc sulfide and zinc sulfide-cadmium sulfide phosphors are treated in a molten zinc or cadmium salt bath at an elevated temperature to effect an exchange of zinc from the molten salt for cadmium from the phosphor particles or cadmium from the molten salt for zinc from the phosphor particles to form phosphor particles in which the concentration of zinc sulfide relative to the concentration of cadmium sulfides varies from the outer portion of the particles to the core portion. After cooling the mixture of the phosphor particles and salt, the salt in the mixture is dissolved in a solvent in which the phosphor particles are substantially insoluble to produce phosphor particles which emit light of different hues when energized by electrons at different energy levels. A viewing screen utilizing these phosphors is also described.

This invention relates to phosphors for color display systems, and more particularly to methods for forming phosphor particles each of which will emit light of different hues when energized by an electron beam at different energy levels.

Briefly, this invention is directed to methods for treating zinc sulfide-containing phosphors to form phosphor particles which will emit light of different hues when energized by electrons of different energy levels. The methods comprise treating the phosphors at an elevated temperature in a bath of a molten salt selected from the group consisting of zinc and cadmium salts, permitting the resulting mixture to cool, and dissolving the salt in the mixture with a solvent in which the tretaed phosphor particles are substantially insoluble. The resulting phosphor particles have a zinc or cadmium sulfide concentration gradient extending from the core portion thereof to the outer portion or surface thereof. Thus, in accordance with the invention, phosphor particles may be produced in which the ratio of zinc sulfide to cadmium sulfide gradually increases from a minimum ratio at the core portion to a maximum at the surface of the outer portion or in which the ratio of zinc sulfide to cadmium sulfide gradually decreases from a maximum ratio at the core portion to a minimum at the surface of the outer portion. Also encompassed by this invention are color display system viewing screens composed of such phosphor particles.

In recently developed color display systems, electron viewing screens are employed which include phosphor particles of different color light-emitting characteristics and which are respectively differently responsive to electrons of differing energies or velocities. In such systems, the viewing screen includes a first phosphor (e.g., one which emits light of relatively long wavelengths such as red) which is energized to emit light when struck by electrons having at least a first predetermined velocity or beam energy level, for example, accelerated by a kinescope accelerating voltage of perhaps 10 kv., this being the operating voltage for the red phosphor, although the phosphor turns on or begins to emit light at much lower voltages. The viewing screen also includes particles of a second phosphor, e.g., one which emits a substantial level of a second color light of shorter wavelengths, and preferably complementary in color to that of the first phosphor (such as a cyan colored light), when energized by electrons having at least a second and higher predetermined velocity, e.g., 15 kv., this being the operating voltage for the second phosphor. That is, while the second phosphor begins to emit light at a lower voltage, perhaps at 10 kv., a substantially higher voltage is used to achieve the required light level. If a beam of electrons of the lower velocity, 10 kv., is current modulated in accordance with the red record represented by the red color information signal derived in the receiver of any conventional color television receiver (such as those operating in accordance with the NTSC, SECAM or PAL systems), a red color image corresponding to the red records is presented on the viewing screen of the kinescope. At electron velocities of 10 kv., the second or cyan light-emitting phosphor will not be significantly energized to emit light, although it may be just turning on. By current modulating a beam of electrons having a beam energy of 15 kv. with the green record represented by the receiver's green color information signal, both the first and second phosphors will be concurrently energized to produce a white or substantially achromatic light. Thus red and white images are produced on the viewing screen either continuously or alternately, by two electron beams moving in registry in a raster scanning pattern across the viewing screen. These images combine to form a composite image which subjectively appears to include a full range of hues including those which are not actually present in a colorimetric sense. Such a two-color system of presenting full color images is known in the art and provides images of pleasing appearance in which the hues appear more saturated than would be expected. Such a system is described in further detail in the coassigned application Ser. No. 452,299, filed Apr. 30, 1965, now Pat. No. 3,371,153.

To obtain an even more desirable color display, a viewing screen is employed which also includes particles of a third phosphor having a higher beam energy threshold e.g., one which emits a substantial level of light of a third color (e.g., blue) when energized by electrons having a higher velocity, e.g., 20 kv. As above, the third phosphor may begin to turn on at a lower voltage, perhaps at 15 kv., but much higher voltages are needed for an operating light level. A beam of such an energy level, modulated in accordance with the blue record represented by the blue color information signal of the television receiver, will energize all three phosphors and produce a third image of cooler achromatic light, and provide a composite image of particularly pleasing color. A more detailed description of such systems may be found in the coassigned application Ser. No. 614,362, filed Feb. 6, 1967, now Pat. No. 3,372,229.

It will be noted in the preceding example that the second phosphor may be considered to have a "barrier" 10 kv., while the third phosphor has a barrier of 15 kv.

In coassigned application Ser. No. 459,582, filed May 28, 1965, now Pat. No. 3,408,223, the methods more particularly described individually coating the particles by physical deposition of a vapor phase material on the surfaces of the phosphor particles. This provides an effective electron retarding barrier layer. In coassigned application Ser. No. 561,815, filed June 30, 1966, now Pat. No. 3,449,148, and Ser. No. 606,190, filed Dec. 30, 1966, now abandoned improved methods are disclosed for forming phosphors which are differently responsive to electrons of different energy levels or velocities, and thus are particularly useful in the above discussed color display systems. In each of these applications particles of different phosphors were utilized to emit light of different hues when the respective types of phosphor particles were energized by electrons at different energy levels. In accordance with the present invention, only one type of phosphor particle is employed to emit light of at least two different hues when energized by electrons at at least two different energy levels.

Among the several objects of this invention may be noted the provision of novel methods for forming phosphors for use in making viewing screens for color display systems in which image colors are controlled by varying the energy level of velocity of an electron beam; the provision of color display systems utilizing particles of a single phosphor which will selectively emit light of two or more different hues when energized by electrons at two or more different energy levels; the provision of methods for forming phosphor particles each of which will emit light of different hues when energized by electrons having different energy levels; and the provision of methods of making such phosphors which are simple, economical and reliable. Other objects and features will be in part apparent and in part pointed out hereinafter.

In the accompanying drawings, in which several of various possible embodiments of the invention are illustrated, FIG. 1 illustrates apparatus used in carrying out a method of the invention for forming phosphor particles which emit light of different hues when energized by electrons at different energy levels;

FIG. 2 and 3 are schematic representations on a greatly enlarged scale of phosphor particles formed by the methods of the invention;

FIG. 4 is a graphical representation of a chromaticity diagram representing the colors present in a color display system of this invention;

FIG. 5 is a graphical representation of the light output versus electron energization characteristics of phosphor particles formed by the methods of the invention; and FIG. 6 illustrates a portion of a viewing screen of a color display system employing phosphor particles prepared by a method of the invention.

Corresponding reference characters indicate corresponding parts throughout the several views of the drawings.

Referring to FIG. 1, a reactor tube or elongate chamber of a heat resistant material such as quartz is indicated by reference character 1. Tube 1 is provided with a gas-permeable fritted quartz plug 3 and is located in an insulated furnace or heater 5. A charge 7 of a zinc or cadmium salt is placed in tube 1 above plug 3 and heated to a molten state. A charge of phosphor particles 9 is then added to the molten salt and becomes suspended therein, the temperature of the suspension being sensed by thermocouple 11. An inert gas, such as nitrogen, is supplied to the tube through inlet 13 and exits through outlet 15. By thus flowing a gas through the suspension of phosphor particles in the molten salt, agitation of the particles is effected which in turn permits substantially uniform formation of phosphor particles in which the ratio of zinc sulfide to cadmium sulfide gradually increases or decreases from the core portion to the surface of the outer portion of the particles. The gas also permits a more even temperature distribution to be attained in the bath of molten salt-phosphor particles.

Particles of zinc sulfide or zinc sulfide-cadmium sulfide (silver activated) phosphors may be treated in accordance with the invention in the above-described apparatus to form phosphor particles having a desired concentration gradient of zinc sulfide to cadmium sulfide which will allow a change of hue of the emitted light as the particles are energized by the electrons at different energy levels. The concentration gradient is produced by the exchange of zinc or cadmium from the molten salt for cadmium or zinc, respectively, from the phosphor particles. Referring to FIGS. 2 and 3 of the drawings, phosphor particles formed by the methods of the invention are represented in cross sectional views. These views are on an enlarged scale and illustrate only three regions of zinc sulfide-cadmium sulfide concentration variation for each particle. Thus, FIG. 2 represents a particle produced by treatment of a red light-emitting phosphor, cadmium sulfide (79%)-zinc sulfide (21%) (silver activated), in accordance with a method of the invention. Upon treatment in a bath of a molten zinc salt, zinc from the bath is exchanged for cadmium from the particle so that the ratio of cadmium sulfide to zinc sulfide on the surface portion of the phosphor particle decreases. As treatment continues, the ratio of cadmium sulfide to zinc sulfide continues to decrease resulting in a concentration gradient extending from the surface portion of the particle inwardly to the core portion. In FIG. 2, the treated phosphor particle is represented as having three regions, the outermost region consisting of zinc sulfide, all cadmium having been exchanged for zinc from the molten zinc salt bath. In the intermediate region, a partial exchange has occurred and the region consists of 72% zinc sulfide and 28% cadmium sulfide. The innermost or core region remains unaltered, no exchange of zinc for cadmium having penetrated this region.

Similarly, FIG. 3 represents a particle produced by treatment of a blue light-emitting phosphor, zinc sulfide (silver activated), in accordance with the inversion. Upon treatment in a bath of a molten cadmium salt, cadmium from the bath is exchanged for zinc from the particle so that the ratio of zinc sulfide to cadmium sulfide on the surface portion of the phosphor particle decreases. As treatment continues, the ratio of zinc sulfide to cadmium sulfide continues to decrease resulting in the concentration gradient extending from the surface portion of the particle inwardly to the core portion. In FIG. 3, the treated phosphor particle is represented as having three regions, the outermost region consisting of 21% zinc sulfide and 79% cadmium sulfide as a result of the exchange of cadmium for zinc. In the intermediate region, a lesser degree of exchange has occurred and the region consists of 72% zinc sulfide and 28% cadmium sulfide. The innermost or core region remains unaltered, no exchange of cadmium for zinc having penetrated this region.

While FIGS. 2 and 3 are schematically representative of phosphor particles formed in accordance with the methods of the invention as having three regions of varying composition, it will be understood that in the practice of the invention the ratio of zinc sulfide to cadmium sulfide in the FIG. 2 embodiment gradually increases from a minimum ratio at the core region or portion to a maximum at the surface of the outer portion with various intermediate ratios of the two compounds rather than merely one ratio occuring in the portions of the phosphor particle between the core portion and outer portion, and that the ratio of zinc sulfide to cadmium sulfide in the FIG. 3 embodiment gradually decreases from a maximum ratio at the core region or portion to a minimum at the surface of the outer portion with various intermediate ratios of the two compounds rather than merely one ratio occurring in the portions of the phosphor particle between the core portion and outer portion.

FIG. 4 shows a chromaticity or CIE diagram with the outer curve being the conventional or 100% saturation curve, the three primary colors blue, green and red being represented by the three apices of the curve. The wavelengths corresponding to the various hues of light emitted are set forth on the outer curve. The inner curve represents the locus of color co-ordinates of light emitted from zinc, cadmium sulfide (silver activated) phosphors of varying zinc to cadmium concentration ratios when excited by proper activating radiation. In the case of a single zinc, cadmium sulfide (silver activated) particle having a cadmium concentration ranging from 0% to 80% the color change would be contained within or fall upon the inner curve due to "spreading" of the electron energy envelope as the electron beam passes into the phosphor particle. With phosphor particles formed by the methods of the invention, such color changes may be attained employing only one type of phosphor particle instead of three different types of phosphor particles through alteration of the energy of the incident radiation, the color of the emitted light being dependent upon the particular region or portion of the phosphor particle which is activated by the incident radiation.

As a specific example of a method of the present invention, five grams of a red light-emitting phosphor, cadmium sulfide (80%)-zinc sulfide (20%) (silver activated) such as that commercially available under the trade designation #1100 from Sylvania Electric Products, and thirty grams of zinc chloride (melting point 262° C.) were mixed and placed in tube 1 of the above-described apparatus of FIG. 1. The mixture was gradually heated from room temperature to a temperature of 500° C. over a period of approximately 40 minutes, and then maintained at a temperature of 500° C. for approximately 30 minutes. The body color of the phosphor was observed to change to yellow as a result of this treatment. The suspension of phosphor particles in the molten zinc chloride was then rapidly cooled, the zinc chloride matrix was removed by dissolving the zinc chloride in water and the treated phosphor particles were extracted.

These treated phosphor particles 9 were applied in a thin layer L to a glass face plate G (FIG. 6) of a cathode ray tube to form a viewing screen of a color display system which may be scanned by a narrow electron beam B which is controlled to generate electrons at different energy levels or velocities. It was noted that a hue shift occurred with a change of voltage, a slightly bluish-green hue light being emitted at an energy level of about 5 kv. and a slightly orangish-yellow hue light being emitted at an energy level of about 25 kv.

As another specific example of the invention, twenty-four grams of zinc chloride was placed in tube 1 and heated to a temperature of 550° C. The temperature of the molten zinc chloride was reduced to 500° C. and five grams of a red light-emitting phosphor, cadmium sulfide (90%)-zinc sulfide (20%) (silver activated such as that commercially available under the trade designation #1100 from Sylvania Electric Products, was added and became suspended therein. The resulting mixture was heated at 500° C. for approximately 30 minutes. After cooling, the phosphor particles were removed from the zinc chloride matrix by dissolving the zinc chloride in water. When tested according to the procedure described above, it was noted that these treated phosphor particles produced a hue shift with a change of voltage, a greenish-yellow hue light being emitted at an energy level of about 5 kv. and a yellowish-orange hue light being emitted at an energy level of about 25 kv.

In another specific example of the present invention, equal weights of cadmium chloride anhydride (melting point 568° C.) and a blue light-emitting phosphor, zinc sulfide (silver activated) such as that commercially available under the trade designation #1320 from Sylvania Electric Products, were mixed and fired in a closed crucible at 600° C. for approximately one-half hour. After cooling, the phosphor particles were removed from the cadmium chloride matrix by dissolving the cadmium chloride in water. The treated phosphor particles were then dried. Upon testing by the procedure described above, it was noted that the treated phosphor particles produced a hue shift with a change of voltage, a greenish-blue hue light being emitted at an energy level of about 5 kv. and a desaturated blue hue light being emitted at energy levels of about 8 kv. and above. The light output (foot candles) versus the electron energization level characteristic of the treated phosphor particles is shown in FIG. 5.

Thus, in accordance with the methods of the present invention, an exchange of zinc from a molten zinc salt for cadmium from phosphor particles or cadmium from a molten cadmium salt for zinc from phosphor particles is effected to form phosphor particles which emit light of different hues when energized by electrons at different energy levels. Accordingly, the phosphor particles formed by methods of the present invention, with the advantageous characteristic of emitting different colors or hues of light at different energy levels, are useful in all types of color display systems. Only one type of phosphor particle need be used in fabricating the viewing screen of this invention and the hue of the light emitted is a function of the particular energy level of the electron beam, a change in this level producing a difference in the wavelength of the light produced.

While the foregoing examples illustrate the use of zinc chloride as a suitable zinc salt and cadmium chloride as a suitable cadmium salt, it will be understood that various other zinc and cadmium salts may be employed to give satisfactory results in the practice of the invention. Other useful zinc and cadmium salts include, for example, zinc acetate, zinc bromide, zinc fluoride, cadmium acetate, cadmium bromide and cadmium nitrate. In general, it is preferred that the zinc or cadmium salt employed not have an excessively high melting point, for example, of over 1000° C. since this undesirably increases the operating temperature for carrying out the methods of the invention. Further, as illustrated by the foregoing examples, it is preferred to carry out treatment of the phosphor particles at a temperature in excess of the melting point of the particular zinc or cadmium salt used but below the boiling point of such salt.

The solvent used to separate the phosphor particles from the molten salt matrix after treatment has been conducted for the desired period of time may be any solvent in which the salt is soluble but in which the phosphor particles are substantially insoluble. Thus, depending upon the particular salt employed, the solvent may be water, methanol, acetone or other commonly available solvents which would be useful to effect separation of the phosphor particles from the salt.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of treating phosphor particles selected from the group consisting of zinc sulfide and zinc sulfide-cadmium sulfide phosphors which emit light of one hue when energized by electrons at different energy levels to form phosphor particles which emit light of different hues when energized by electrons at different energy levels; said method comprising heating the first said particles at an elevated temperature in a bath of a molten salt selected from the group consisting of zinc and cadmium salts, said salt being a cadmium salt when said particles are zinc sulfide phosphors, permitting the resulting mixture to cool, and dissolving the salt in said mixture with a solvent in which the treated phosphor particles are substantially insoluble.

2. A method as set forth in claim 1 wherein the phosphor particles consist essentially of a zinc sulfide-cadmium sulfide phosphor and the molten salt is a zinc salt.

3. A method as set forth in claim 1 wherein the phosphor particles consist essentially of a zinc sulfide phosphor and the molten salt is a cadmium salt.

4. A method as set forth in claim 1 wherein said elevated temperature is above the melting point of said salt and below the boiling point of said salt.

5. A method as set forth in claim 2 wherein said salt is zinc chloride.

6. A method as set forth in claim 3 wherein said salt is cadmium chloride.

7. In a color display system for producing colored images, a viewing screen comprising integral phosphor particles selected from the group consisting of zinc sulfide and zinc sulfide-cadmium sulfide phosphors each of which will emit light of different colors when energized by electrons of different energy levels, said phosphor particles being formed by treatment of particles selected from the group consisting of zinc sulfide and zinc sulfide-cadmium sulfide phosphors which emit light of one hue when energized by electrons of different energy levels at an elevated temperature in a bath of a molten salt selected from the group consisting of zinc and cadmium salts, said salt being a cadmium salt when said particles are zinc sulfide phosphors, the ratio of zinc sulfide to cadmium sulfide in said phosphor particles gradually varying from the core portion thereof to the outer surface portion thereof.

8. In a color display system as set forth in claim 7, said integral phosphor particles consisting essentially of a zinc sulfide-cadmium sulfide phosphor, said molten salt consisting essentially of a zinc salt and the ratio of zinc sulfide to cadmium sulfide in said phosphor particles gradually increasing from a minimum ratio at the core portion thereof to a maximum at the surface of the outer portion thereof.

9. In a color display system as set forth in claim 7, said integral phosphor particles consisting essentially of a zinc sulfide phosphor, said molten salt consisting essentially of a cadmium salt and the ratio of zinc sulfide to cadmium sulfide in said phosphor particles gradually decreasing from a maximum ratio at the core portion thereof to a minimum at the surface of the outer portion thereof.

References Cited

UNITED STATES PATENTS

| 2,435,436 | 2/1948 | Fonda | 252—301.6 X |
| 2,968,627 | 1/1961 | Wachtel | 252—301.6 |
| 3,010,909 | 11/1961 | Klasens et al. | 252—301.6 |

TOBIAS E. LEVOW, Primary Examiner

J. COOPER, Assistant Examiner

U.S. Cl. X.R.

313—92, 108